UNITED STATES PATENT OFFICE.

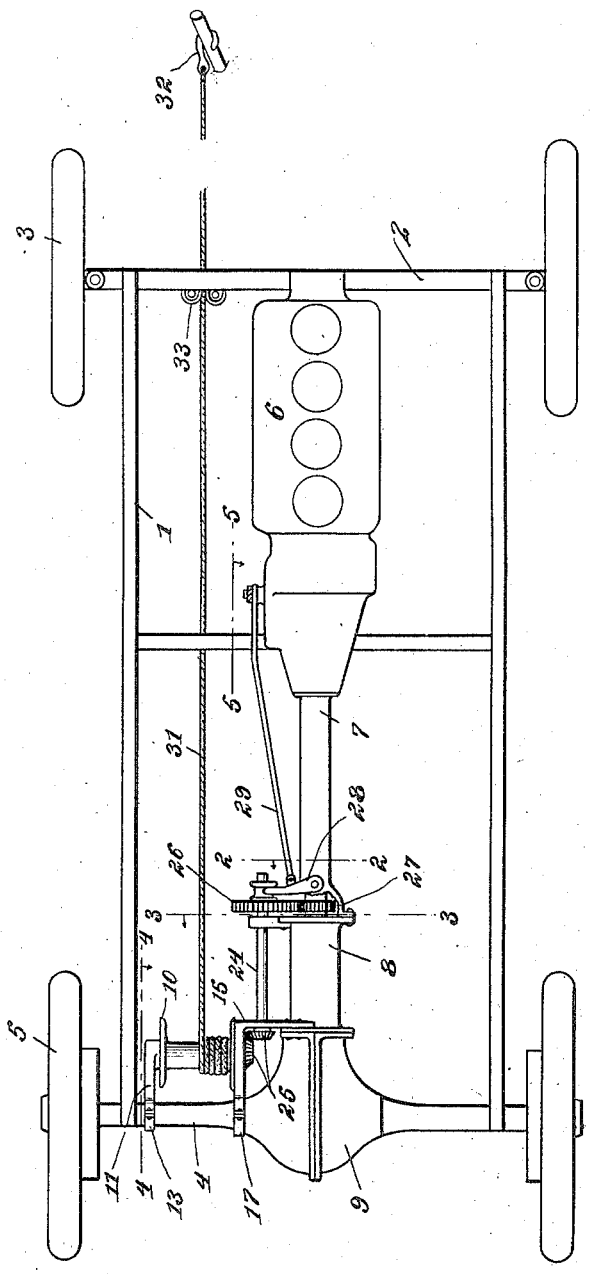

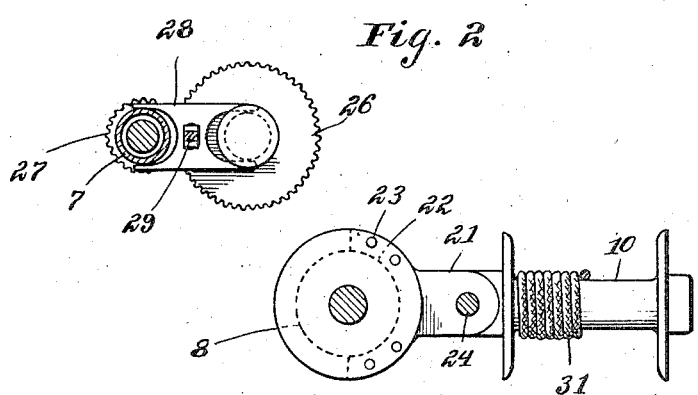
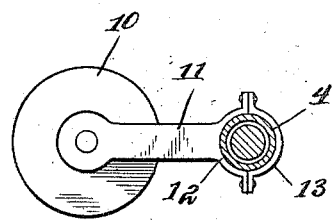
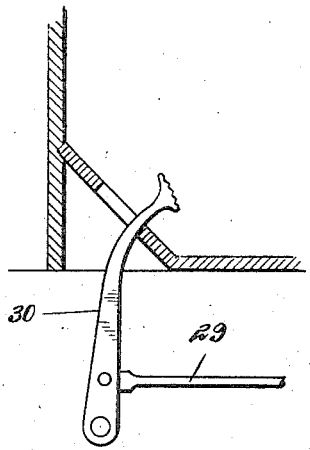
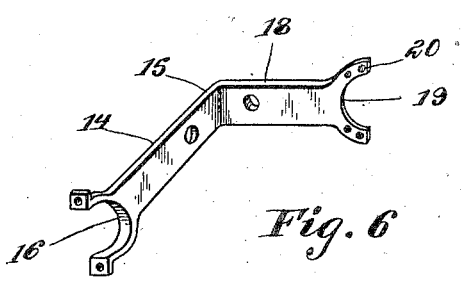

ORMAND CLINTON LILES, OF FARMVILLE, NORTH CAROLINA.

MOTOR-VEHICLE EXTRICATOR.

1,232,342.

Specification of Letters Patent.

Patented July 3, 1917.

Application filed March 17, 1917. Serial No. 155,499.

*To all whom it may concern:*

Be it known that I, ORMAND C. LILES, a citizen of the United States, residing at Farmville, in the county of Pitt and State of North Carolina, have invented new and useful Improvements in Motor-Vehicle Extricators, of which the following is a specification.

This invention relates to motor vehicle extricators, the object in view being to provide extricating apparatus capable of being applied to autotmobiles already in use, the extricating apparatus embodying in connection with a draft cable adapted to extend either to the front or rear of the vehicle, a winding drum, and operating mechanism for said winding drum adapted to be thrown into and out of gear with the engine, whereby the engine is utilized as a motive plant for actuating the cable winding drum for the purpose of propelling or extricating the vehicle from a mired position.

With the above and other objects in view, the invention consists in the novel construction, combination and arrangement of parts, herein fully described, illustrated and claimed.

In the accompanying drawings:—

Figure 1 is a plan view of the chassis of a motor vehicle, showing the extricating apparatus in its applied relation thereto and the means whereby the apparatus is mounted upon certain parts of the chassis.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a detail perspective view of the corner bracket.

Referring to the drawings 1 designates the frame of a motor vehicle, 2 the front axle, 3 the steering wheels, 4 the rear axle housing, 5 the rear driving wheels, 6 the engine, 7 the tubular housing for the main driving shaft, 8 the housing for the transmission gearing and 9 the housing for the differential gearing, all of the parts thus far enumerated being of the usual construction and arrangement in accordance with the present day automobile or motor vehicle practice.

In carrying out the present invention, I provide a winding drum 10 having its shaft journaled at one end in a supporting arm or bracket 11 having an arcuate rear end 12 which partially embraces the rear axle housing 4 and is secured fixedly thereto by means of a U-bolt or clip 13. The other end of the shaft of the drum 10 is journaled in one arm 14 of an L-shaped bearing bracket or support 15, the rear end of the arm 14 being arcuate in shape as shown at 16 to partially embrace the rear axle housing 4 to which it is fixedly secured by means of a U-bolt or clip 17. The other arm 18 of said supporting bracket has an arcuate end portion 19, which partially embraces the housing 8 of the transmission gearing and which is provided with holes 20 to receive some of the bolts or cap screws by means of which the housing 8 is fixedly secured to the housing 9.

Secured to the housing 8 in advance of and in spaced relation to the arm 18 is another supporting arm 21 having an arcuate end portion 22 formed with holes 23 to receive some of the bolts or cap screws by which the shaft housing 7 is secured to the housing 8. The arms 18 and 21 are provided with bearings for a shaft 24 parallel to the main driving shaft in the housing 7 and at right angles to the shaft of the drum 10, the shafts 10 and 23 having at their adjacent ends miter gears 25 in constant mesh with each other. Slidingly mounted upon but feathered to the shaft 24 is a gear 26 movable into and out of mesh with a gear 27 on the drive shaft which passes through the housing 7.

Means for shifting the gear 26 into and out of mesh with the gear 27 comprises a shifting fork 28 having attached thereto an operating connection 29 shown in the form of a rod which extends to one arm of a manually operable lever 30, shown in the form of a foot lever adapted to be operated by the driver of the machine. A cable 31 is wrapped around and secured to the drum 10 and is provided at its extremity with a hook 32 enabling the end of the cable to be passed around a tree, post, stake or other suitable form of anchor. 33 designates a guiding pulley secured to the front axle 2 and serving as a guide for the cable 31 as the same is unwound from or wound upon the drum 10.

From the foregoing description taken in connection with the accompanying drawings it will now be understood that the cable 31 may be extended beyond the front or beyond the rear of the vehicle according to the direction in which the vehicle is to be propelled in order to extricate the same from a mired position. The gear 26 is shifted into mesh with the gear 27 either before or after starting the engine 6 and thereupon the engine transmits its power through the connections described to the drum, causing the cable 31 to be wound around the drum after said cable has been secured to a suitable anchor of the character referred to. It will be understood, in view of the description and drawings that the extricating mechanism is capable of being applied to a motor vehicle either at the time of manufacture or subsequently thereto. The means for supporting the drum shaft and countershaft 24 is of such a character that it is thoroughly braced in relation to the parts of the chassis which are capable of withstanding the greatest stresses, the same consisting of the differential housing, the rear axle housing, and the transmission housing. This greatly reduces the liability of straining, twisting or distorting essential parts of the running gear of the vehicle.

I claim:—

The combination with the chassis of a motor vehicle, of a bearing support comprising arms extending substantially at a right angle to each other, means for securing one of said arms fixedly to the rear axle housing, means for securing the other arm of said bearing support to the housing of the transmission gearing, a bearing arm secured fixedly to the rear axle housing in spaced relation to the first named bearing support, a drum having its shaft parallel to the rear axle housing and journaled in said spaced bearing arms, a bearing arm fixedly secured to the housing of the transmission gearing in spaced relation to the first named bearing support, a countershaft at right angles to the drum shaft geared thereto and journaled in the arms secured to the housing of the transmission gearing, a draft cable attached to said drum, a gear feathered to and slidable on said countershaft, a gear on the main driving shaft of the vehicle, and manually controlled means for shifting the first named gear into and out of mesh with the last named gear.

In testimony whereof I affix my signature.

ORMAND CLINTON LILES.